D. S. Dunning,
Invalid Bedstead.
Nº 17,558. Patented June 16, 1857.

UNITED STATES PATENT OFFICE.

D. S. DUNNING, OF NEW YORK, N. Y.

INVALID-BED ELEVATOR.

Specification of Letters Patent No. 17,558, dated June 16, 1857.

*To all whom it may concern:*

Be it known that I, D. STRINGHAM DUNNING, of the city, county, and State of New York, have invented a new and useful Implement or Device for Raising Invalids from Their Beds and Conveying Them, if Required, from Place to Place Within an Apartment; and I do hereby declare that the following is a full, clear, and exact description of the same, reference being had to the annexed drawings, making a part of this specification, in which—

Figure 2:
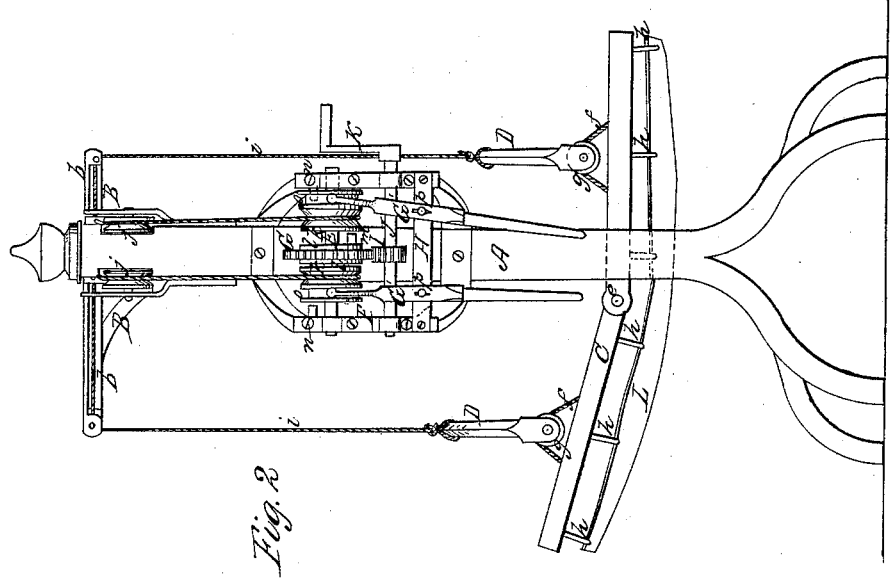
Figure 1:
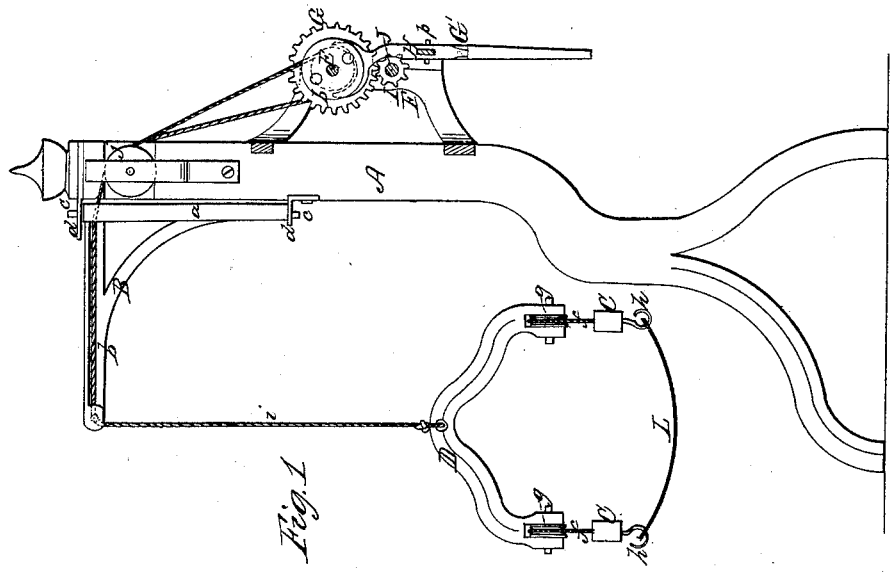

Figure 1, is a side elevation of my improvement. Fig. 2, is a back elevation of ditto.

Similar letters of reference indicate corresponding parts in the two figures.

My invention consists in having two jointed bars attached to bail-shaped or bowed cross-pieces, to which chains or ropes are attached; said chains or ropes passing through cranes attached to an upright and secured to winches; the whole being arranged as will be hereinafter fully shown and described, whereby invalids may be raised from their beds with the greatest facility, and if required moved from place to place within an apartment.

To enable those skilled in the art to fully understand and construct my invention, I will proceed to describe it.

A, represents an upright, the lower part of which is slightly curved and supported by a proper base or legs. To the upper part of the upright A, two cranes B, B, are attached. These cranes are formed each of an upright bar ($a$), having a horizontal bar ($b$), attached to their upper ends, properly braced. The upright bar ($a$), of each crane is provided with a journal ($c$), one at each end, and these journals are fitted and allowed to turn freely in plates ($d$), ($d$), attached to the upright; see Fig. 1. The upright and cranes may be constructed of either wood or metal.

C, C, represent two bars, each of which is joined at its center, as shown at ($e$), Fig. 2. These two bars are connected to bail-shaped cross-pieces D, D, by means of ropes ($f$), which pass over pulleys ($g$) in the ends of the cross pieces; both ends of the ropes being firmly attached to the bars C, C. To the under side of each bar C, hooks ($h$) are attached. To each cross piece D, a rope or chain ($i$) is attached. These ropes or chains pass through the ends of the horizontal bars ($b$), of the cranes B, and over pulleys ($j$), which are secured one at each side of the upright A at its upper end, the ropes or chains being attached to pulleys ($k$), ($k$), which are placed loosely on a horizontal shaft E, fitted in a small frame F, attached to the back side of the upright A. A toothed wheel G is attached to the center of the shaft E; and a circular plate ($l$) is attached to each side of the wheel G; each plate having a pin ($m$), attached. A pin ($n$) is also attached to each side of the frame F; and a groove ($o$) is made circumferentially in each pulley ($k$); and the forked end of levers $G^1$ are fitted in the grooves ($o$); said levers working on fulcrum pins ($p$), which pass through a bar H, attached to the frame F. By operating the levers $G^1$, the pulleys may be thrown in and out of gear with the wheel G, so that either or both may be moved; when the pulleys are in gear with the wheel G, the pins ($m$) fit in holes in the inner sides of the pulleys; when out of gear with it, the pins ($n$), fit in holes in the outer sides.

I is a pinion which gears into the wheel G. This pinion is placed on a shaft J, which is placed in the lower end of the frame F; and one end of this shaft is provided with a crank K.

From the description of parts, it will be seen that the two bars C, C, may be raised or lowered by turning the shaft J; and either end of the bars may be raised or lowered so that they may be inclined as desired, by throwing the proper pulley ($k$) out of gear with the wheel G. The implement is used by attaching a sacking L, which is placed underneath the bed of the invalid, to the bars C, C; the edge of the sacking has holes made through it so that it may be fitted on the hooks ($h$), and the bed and invalid may therefore be raised by merely turning the shaft J; and the bed may be inclined by shifting the pulleys ($k$), so that the position of the invalid may be changed when desired, or the bed adjusted to suit the convenience of the occupant. If the base of the upright is provided with casters, the implement may be moved from place to place; and by judiciously operating the crank K, and levers $G^1$, $G^1$, the invalid may be gently lowered and placed easily in a chair in a sitting position, or placed in a reclining position on a couch or sofa.

This implement is extremely simple, and useful. It is necessary of course to remove invalids frequently from their beds, in order to insure their own comfort. This, however, is now attended with so much embarrassment, and in many cases with pain to invalids, that it is often neglected. By my improvement these disadvantages are obviated.

Having thus described my invention, what I claim as new, and desire to secure by Letters Patent, is:

The jointed bars C, C, connected by the cross pieces D, D; the cranes B, B, attached to the upright A; the winches formed of the sliding pulleys (k), (k), and gear G, I; the ropes or chains (i), attached to the pulleys (k), and cross pieces D, of the bars C; the whole being combined and arranged substantially as herein shown and described, for the purpose set forth.

D. STRINGHAM DUNNING.

Witnesses:
W. Tusch,
L. F. Cohen.